United States Patent Office 3,642,819
Patented Feb. 15, 1972

3,642,819
OXOCYCLOHEPTA[c]PYRROLES
Irwin J. Pachter, 42 Juneau Blvd., Woodbury, N.Y. 11797, and Karl Schoen, 83—36 Beverly Road, Kew Gardens, N.Y. 11415
No Drawing. Application Sept. 1, 1967, Ser. No. 664,942, which is a continuation-in-part of applications Ser. No. 575,303, Aug. 26, 1966, and Ser. No. 599,387, Dec. 6, 1966. Divided and this application July 15, 1968, Ser. No. 768,567
Int. Cl. C07d 27/54
U.S. Cl. 260—326.5 J  3 Claims

ABSTRACT OF THE DISCLOSURE

Process for preparing 2-aminoalkyl pyrrol-3-yl ketones and derivatives thereof, and oxocyclohepta[c]pyrroles thus produced. The process is carried out by quaternizing 2-dimethylamino- or 2 - piperidino - alkyl-pyrrol - 3 - yl ketones or derivatives thereof, including those having bi- and tricyclic nuclei, and reacting the quaternary salts either with a base and an amine, or, alternatively, with an amine only.

CROSS REFERENCE TO OTHER APPLICATIONS

This application is a division of application Ser. No. 664,942, filed Sept. 1, 1967 and now abandoned, which application was in turn a continuation-in-part of our copending applications Ser. No. 575,303, filed Aug. 26, 1966 and now abandoned, and Ser. No. 599,387, filed Dec. 6, 1966 and now abandoned. Certain of the compounds disclosed herein are described in our copending applications Ser. No. 403,387, filed Aug. 12, 1964 and now Patent No. 3,410,587 issued Nov. 12, 1968, and Ser. No. 357,284, filed Apr. 3, 1964 and now abandoned.

BACKGROUND OF THE INVENTION (1) Field of the invention

This invention relates to novel compounds which are useful as tranquilizers, anti-depressants and analgetics.

(2) Description of the prior art

Various compounds within the following class are known and have been described, for example, in our above-noted copending applications.

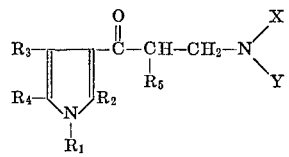

FORMULA A

In the above formula:

$R_1$ designates hydrogen, a lower alkyl group having a maximum of 6 carbon atoms, phenyl, phenyl alkyl (where the alkyl group has up to 3 carbons), substituted phenyl or substituted phenyl-lower alkyl in which the substituent on the phenyl ring is halogen, lower alkyl, i.e., wherein the alkyl group has not more than 4 carbon atoms, lower alkoxy of not more than 4 carbon atoms, halogenated alkyl or not more than 4 carbon atoms, or 2-, 3- or 4- pyridyl;

$R_2$, $R_3$ and $R_4$ designate hydrogen alkyl, alkenyl or cycloalkyl having a maximum of 8 carbon atoms, phenyl, halo-phenyl, (lower alkoxy)-phenyl, thienyl, furyl, or benzyl;

$R_3$ and $R_4$ may be linked to constitute an alicyclic ring having a maximum of 8 carbon atoms;

$R_5$ designates hydrogen, alkyl, alkenyl or cycloalkyl, all having a maximum of 8 carbon atoms, phenyl or benzyl; and $R_2$ or $R_3$ may be linked with $R_5$ to constitute alicyclic rings having a maximum of 8 carbon atoms, those rings formed by linking $R_2$ and $R_5$ optionally being substituted by alkyl groups having 1–4 carbon atoms and those rings formed by linking $R_3$ and $R_5$ optionally being substituted by an alkyl or alkylidene group having 1–4 carbon atoms, a benzylidene or a benzyl group.

X and Y are each the same or different and are hydrogen, lower alkyl, lower alkynyl, lower alkenyl, cycloalkyl, bicycloalkyl, hydroxy-lower alkyl, alkoxy-lower alkyl, lower dialkyl-amino, lower acyloxyalkyl, carbamoyloxy-lower alkyl, phenyl-lower alkyl, heteroaromatic-lower alkyl, heteroaryl and saturated heteroaryl, and wherein X and Y may be linked, and when linked constitute a heterocyclic ring of not more than eight members.

Some of the compounds embraced within the scope of general Formula A, as set forth above, have heretofore been prepared, or may be prepared, through the Mannich reaction of the corresponding pyrrol-3-yl ketone with formaldehyde or a formaldehyde-yielding substance, e.g., paraformaldehyde, and a base X—NH—Y as set forth in the following reaction scheme:

REACTION SCHEME I

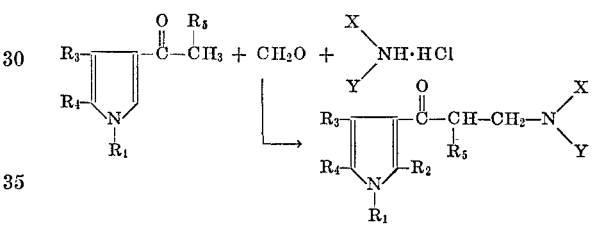

Resonance interaction of the electron-rich pyrrole ring with the ketone carbonyl in the pyrrole ketones renders these less reactive than structurally related aromatic ketones such as phenyl ketones and naphthyl ketones. One result of such lower reactivity is that the Mannich reaction proceeds very slowly with many of the important bases X—NH—Y or their corresponding salts. It has been found that side reactions occur during the prolonged reflux periods necessary for complete reaction; and frequently there are produced dark products which are difficult to purify.

Of the various Mannich reactions carried out, those with dimethylamine hydrochloride proceed most rapidly, with better yield and with higher purity. However, it has not been possible to produce primary or secondary amino alkyl ketones by the method of Reaction Scheme I, that is to say, compounds of general Formula A herein wherein the moieties X and Y may either or both be hydrogen.

SUMMARY OF THE INVENTION

We have discovered that it is advantageous in the preparation of pure products of Formula A in high yield to use as starting materials compounds of the following formula:

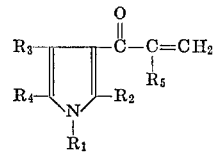

FORMULA B

Compounds of Formula B can be conveniently produced from quaternized salts of the dimethylamine Mannich bases of Formula A by splitting off therefrom, under alkaline conditions, the tertiary amine moiety.

Thus, it can be generalized that the dimethylamine Mannich bases can constitute the starting materials for the preparation of Mannich bases having a different amino function from that of starting compound A.

Illustrative of our process is the sequence of steps just mentioned and set forth below:

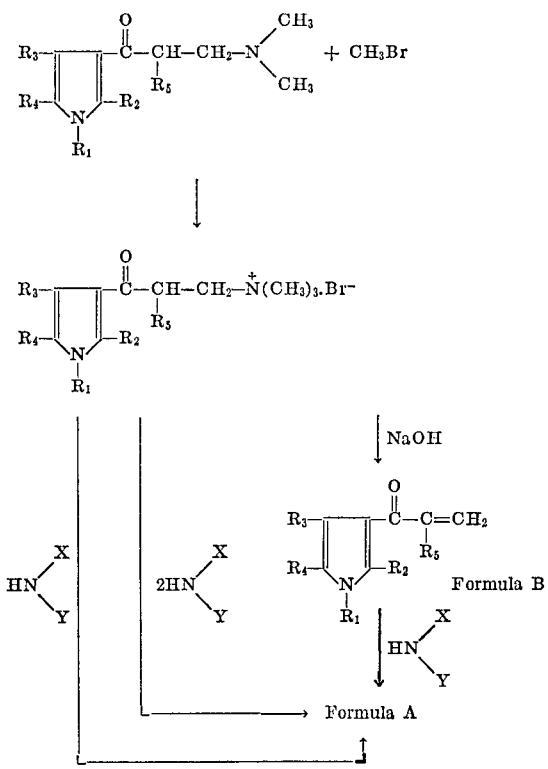

REACTION SCHEME II

In accordance with such process, which is the subject of our copending application Ser. No. 768,569 filed July 16, 1968, the dimethylamine Mannich base is quaternized with an alkyl halide or sulfate, suitably a lower alkyl halide or sulfate such as methyl-, ethyl- or propyl-bromide, chloride, iodide, or sulfate, and the resulting quaternary salt is treated with aqueous alkali, suitably aqueous sodium or potassium hydroxide, to produce the stable methylene derivative.

Upon interaction of the methylene compound with a new base there is produced a final product of good quality and in high yield.

The success of the process is a consequence of such unusual stability of the methylene compounds of the Formula B (in which the symbols $R_1$ to $R_5$ have the same meaning as in Formula A). The compounds of Formula B are more resistant to polymer-forming side reactions than are structurally comparable aryl derivatives such as the acrylophenones.

The novel compounds of the present invention are those of Formula A wherein the moiety X and/or Y are hydrogen, which could not be satisfactorily prepared by the method of Reaction Scheme I. The present invention further includes compounds wherein X and/or Y are lower alkynyl, lower alkenyl, cycloalkyl, alkoxy-lower alkyl, lower dialkylamino, heteroaromatic-lower alkyl, heteroaryl and saturated heteroaryl.

More particularly, the novel compounds within the scope of the present invention are those of the formula:

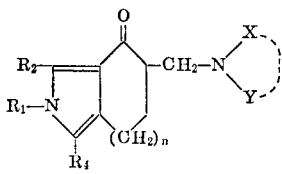

wherein $n$ is 2;

$R_1$, $R_2$ and $R_4$ are hydrogen, alkyl having a maximum of 6 carbon atoms, phenyl, phenyl alkyl the alkyl group of which has a maximum of 3 carbon atoms, substituted phenyl or substituted phenyl alkyl, in which the phenyl moieties may be substituted by halogen, alkyl of not more than 4 carbon atoms, or alkoxy of not more than 4 carbon atoms;

X and Y are each the same or different and are hydrogen lower alkyl, lower alkynyl, lower alkenyl, cycloalkyl, hydroxy lower alkyl, lower alkoxy-lower alkyl, di(lower alkyl) amino, lower alkanoyloxy lower alkyl, carbamoyloxy-lower alkyl, phenyl-lower alkyl, heterocyclic radicals, heterocyclo lower alkyl radicals or, together with the nitrogen atom to which they are attached, a single heterocyclic unit.

The compounds of the foregoing Formula A have central nervous system activity; and are particularly useful as tranquilizers, ataractics, and sedatives. They are also useful as analgetics and antidepressants.

The compounds can be put up in customary pharmaceutical composition forms such as tablets, capsules, syrups, suppositories etc., in accordance with the techniques of pharmaceutical compounding employing appropriate carrier or vehicular materials as excipients, etc.

The compounds may be administered at dosage levels of about 0.07–3 mg./kg., preferably between 0.7–1.8 mg./kg. daily. A compound prepared by the process described herein showed marked antipsychotic activity in humans when administered at the preferred level—i.e., 50–125 mg. per patient daily. Chronic schizophrenic male patients showed improvement in disorientation, thinking and perceptual distortion as well as in schizophrenic disorganization and social competence.

PREFERRED EMBODIMENTS OF THE INVENTION

In the preferred embodiments of the present invention, $R_1$ is hydrogen; a lower alkyl group, such as methyl, ethyl, propyl, butyl or hexyl; phenyl; phenyl lower alkyl, such as benzyl, phenethyl or phenylbutyl; or substituted phenyl or substituted phenyl alkyl, wherein the substituent on the phenyl ring is chloro, bromo, or fluoro, alkyl of not more than 4 carbon atoms, or alkoxy of not more than 4 carbon atoms, i.e., methoxy, ethoxy, propoxy or butoxy.

Concurrently, $R_2$ and $R_4$ may be lower alkyl groups, such as methyl, ethyl, propyl, butyl or hexyl; phenyl; phenyl lower alkyl, such as benzyl, phenethyl or phenylbutyl; or substituted phenyl or substituted phenyl alkyl, wherein the substituent or each phenyl ring is chloro, bromo, or fluoro, alkyl of not more than 4 carbon atoms, or alkoxy of not more than 4 carbon atoms. i.e., methoxy, ethoxy, propoxy or butoxy.

X and Y are the same or different and may each be hydrogen; lower alkyl, such as methyl, ethyl, butyl, pentyl, hexyl, or heptyl; lower alkynyl, such as propynyl, butynyl or pentynyl lower alkenyl, such as propenyl, butenyl or hexenyl; cycloalkyl, suitably cyclo-lower alkyl, such as cyclopropyl, cyclobutyl, cyclopentyl, cyclohexyl or cyclooctyl; hydroxy lower alkyl; lower alkoxy lower alkyl, di(lower alkyl) amino, such as dimethylamino; lower acyloxy alkyl, suitably lower alkanoyloxy lower alkyl; carbamoloxy lower alkyl; phenyl lower alkyl; a heterocyclic radical or a heterocyclo lower alkyl radical.

When either X or Y is a heterocyclic radical or a heterocyclo lower alkyl radical, the heterocycle may be a piperidino, piperidinyl, pyrrolidinyl, morpholino, morpholinyl, thiomorpholino, thiomorpholinyl, piperazinyl, pyridyl, pyrimidinyl, pyridazinyl, pyrazolyl, quinolyl, isoquinolyl, pyrrolyl, thienyl, furyl, oxazolyl or tetrazolyl group.

Alternatively, X and Y may, together with the nitrogen atom to which they are attached, form a heterocyclic unit. In such instance they may jointly define a heterocycle selected from the group consisting of piperidino, (lower alkyl) piperidino, di(lower alkyl) piperidino, (lower alkoxy) piperidino, hydroxypiperidino, alkoxycarbonylpiperidino, phenyl hydroxypiperidino, (lower alkanoyl) piperidino, pyrrolidinyl, (lower alkyl) pyrrolidinyl, (lower alkoxy) pyrrolidinyl, hydroxy-pyrrolidinyl, morpholino, (lower alkyl) morpholino, thiomorpholino, (lower alkyl) thiomorpholino, piperazinyl, (lower alkyl) piperazinyl, di(lower alkyl) piperazinyl, (lower alkoxy) piperazinyl, phenylpiperazinyl, chlorophenylpiperazinyl, tolylpiperazinyl, (methoxyphenyl) piperazinyl, hydroxyalkylpiperazinyl, lower alkanoyloxy-lower alkyl-piperazinyl, and azabicyclo-lower alkyl, wherein "lower alkanoyl," "lower alkyl" and "lower alkoxy" have 1–5 carbon atoms.

In a preferred modification of the process for synthesizing the oxo-cyclohepta[c]pyrroles hereof, a dimethylamino Mannich base within general Formula A is utilized as the starting material for other Mannich bases of Formula A having a different amino function.

Although dimethylamino Mannich bases are most advantageous as starting materials for this process, other lower alkylamino Mannich bases as well as heterocyclic bases such as the piperidino Mannich base may also be used.

In the preferred procedure, the Mannich base, which is usually obtained in the form of an acid salt, suitably the hydrochloride, is treated with aqueous ammonia and the free Mannich base isolated from the aqueous mixture. In a suitable mode of isolation, the base is extracted from the reaction mixture with a low boiling, reaction inert, water-immiscible solvent, such as ethyl acetate, diethyl ether, or the like. Upon evaporation of the solvent, the base is taken up in a suitable organic solvent, preferably a non-hydroxylic, polar organic solvent such as acetone, and treated with the quaternizing agent. In the preferred modification, gaseous methyl bromide is used as the quaternizing agent, and is bubbled into the solution of the Mannich base until no further separation of the quaternary is noted. The quaternary salt is then isolated as a residue by filtration, and recrystallized, suitably from a lower alkanol such as methanol.

The quaternary salt has the general Formula C

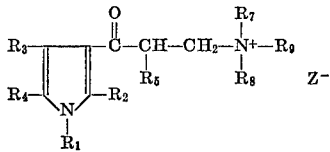

where

R$_1$, R$_2$, R$_3$, R$_4$ and R$_5$ are as above.

R$_9$, R$_7$ and R$_8$ are alkyl having from 1 to 8 carbon atoms; however, R$_9$ and R$_7$ may be joined to form a ring containing up to 7 carbon atoms, i.e., the piperidine, pyrrolidine and hexamethylenimine nuclei;

Z is an inorganic radical such as chloride, bromide, sulfate, or the like.

The quaternary salt of the Mannich base, for example, the methobromide, the methiodide, the methosulfate, or the like, is dissolved in water and treated with an excess of an alkali such as aqueous sodium hydroxide, ammonia, or a strong organic base such as triethylamine. The desired vinyl compound of general Formula B separates as a precipitate, and is isolated. The vinyl compound of general Formula B is then purified, preferably by recrystallization from the suitable solvents such as a lower alkanol, preferably ethanol.

The vinyl compounds of general Formula B are then reacted with amines of the general formula X—NH—Y, wherein X and Y have the significance set forth hereinabove, and may thus represent primary amines or secondary cyclic or acyclic amines.

The reaction of the amine with the compound of Formula B may be carried out in a number of modifications. The preferred mode will depend upon the reactivity and volatility of the respective reactants. Many primary and secondary amines will react with compounds of Formula B at ambient temperature, that is to say, from about 10° C. to about 30° C. with evolution of heat where the reaction is carried out in a solvent such as a lower alkanol, for example, methanol, ethanol, propanol, butanol, and the like, or in di-lower alkyl ketones, for example, acetone methylethyl ketone, di-isopropyl ketone, and the like, as well as in lower alkyl lower alkanoates such as ethyl acetate, propyl acetate and butyl propionate.

Where desired, the reaction may be carried out in similar solvents under reflux at temperatures of from about 50° to about 150° C. Where it is desired to use low boiling solvents, particularly with volatile amines, the reaction may be advantageously carried out in pressure vessel at temperatures up to about 150° C. In yet another modification of the procedure, it is sometimes advantageous to use excess of the amine base itself as the solvent.

Reaction time varies from one minute to 24 hours, depending upon the nature of the reactants. Most reactions proceed to completion in less than 8 hours.

Among the amines which may be employed in the process of the present invention which may be primary or secondary, may be included those bearing alkyl groups, suitably lower-alkyl groups, such as methyl, ethyl, propyl, and butyl; cycloalkyl groups, such as cyclopropyl and cyclohexyl; alkenyl groups, suitably lower-alkenyl groups, such as allyl, methallyl and hexenyl; alkynyl groups, suitably lower alknyl groups, such as propynyl, butynyl, and hexynyl groups; or phenyl-alkyl groups, suitably phenyl lower alkyl groups such as benzyl, phenethyl, and phenylbutyl groups; alkoxy-alkyl groups, suitably lower alkoxy-lower alkyl groups, such as methoxyethyl, ethoxyethyl, butoxyethyl, pentoxypropyl; hydroxyalkyl groups, suitably hydroxy-lower alkyl groups, such as hydroxyethyl, hydroxypropyl, hydroxylbutyl, or hydroxylhexyl, dialkylamino such as dimethylamino.

Also included within the scope of the amines used in this process are heterocyclic secondary amines, wherein the secondary amino function is part of the cyclic moiety which may, if desired, itself be substituted. Preferred among these compounds are five or six membered heterocyclic amines containing at least one nitrogen-atom in the ring, and from zero to two other heteroatoms of the group oxygen, nitrogen and sulfur such as piperidino, (lower alkyl) piperidino, di(lower alkyl) piperidino, (lower alkoxy) piperidino, hydroxypiperidino, alkoxycarbonylphenylpiperidino, phenylhydroxypiperidino, (lower alkanoyl) piperidino, pyrrolidinyl, (lower alkyl) pyrrolidinyl, (lower alkoxy) pyrrolidinyl, hydroxypyrrolidino, morpholino, (lower alkyl) morpholino, thiomorpholino (lower alkyl thiomorpholino, di-(lower alkyl) thiomorpholino, (lower alkoxy) thiomorpholino, piperazinyl, (lower alkyl) piperazino, di(lower alkyl) piperazinyl, (lower alkoxy) piperazino, phenylpiperazinyl, chlorophenylpiperazino, tolylpiperazino, (methoxyphenyl) piperazinyl, hydroxyalkylpiperazinyl, lower alkanoxyloxy-lower alkylpiperazino, carbamoyloxy-lower alkyl piperazinyl, and azabicycloalkyl such as 3-azaspiro [5,5] undecanyl and 3-azabicycol [3,2,2] nonyl. The terms "lower alkyl" and "lower alkoxy" refer to both straight and branched chain radicals of no more than 5 carbon atoms.

Furthermore, there are included primary and secondary amines wherein one of the substituents of the amino moiety corresponds to a radical derived from any of the aforementioned heterocyclic groups, for example, morpholinyl, pyrrolidinyl, thiomorpholinyl, piperazinyl, as well as the unsaturated derivatives thereof, for example, picoyl, tetrazolyl and the like.

In another modification of the process, the quaternary salt (Formula C) derived from the starting material Mannich base of Formula A may be converted into the desired end product without the isolation of the intermediate methylene compound of Formula B. In this modification as set forth in Reaction Scheme II, the new organic base, that is to say, the amine, may serve as both the source of alkali and as the reactant.

In the course of the reaction the original amine is removed as a vapor while the solvent and the unreacted new amine remain in the reaction vessel.

The novel dimethylaminoalkyloxoisoindoles of this invention are readily prepared by the process of Reaction Scheme I, starting with an oxoisoindole.

Other aminoalkyloxoisoindoles are most satisfactorily derived from the corresponding dimethylaminoalkyloxoisoindole by the general method of Reaction Scheme II, although many products which are tertiary amines may also be prepared by the process of Reaction Scheme I.

The following examples describe preferred embodiments of the novel oxocyclohepta[c]pyrroles of this invention.

The temperatures in the following examples are in degrees centigrade.

Example 1.—5 - dimethylaminomethyl 2,4,5,6,7,8 - hexahydro-1,3-dimethyl-4-oxocyclohepta [c] pyrrole hydrochloride To a Grignard solution prepared from 13.5 g. of magnesium, 60.5 g. of ethyl bromide and 150 ml. of ether was added 47.6 g. of 2,5-dimethylpyrrole in 140 ml. of ether. After 15 minutes, a solution of 63.0 g. of glutaric anhydride in 560 ml. of tetrahydrofuran was added. The resulting mixture was heated under reflux with stirring for 20 minutes. Addition of 25% aqueous ammonium chloride terminated the reaction. The ether-tetrahydrofuran layer was evaporated to dryness. The residue was shaken with aqueous sodium hydroxide and washed with ether. The alkaline layer was acidified and 2,5-dimethyl-6-oxopyrrole-3-valeric acid, M.P. 149–150°, was collected. The acid was treated with hydrazine and potassium hydroxide at 190° to yield 2,5-dimethylpyrrole-3-valeric acid which was cyclized directly with polyphosphoric acid to give 2,4,5,6,7,8-hexahydro-1,3-dimethyl - 4 - oxocyclohepta [c] pyrrole.

Reaction with dimethylamine hydrochloride and paraformaldehyde in refluxing ethanol yields 2,4,5,6,7,8-hexahydro-1,3-dimethyl - 5 - dimethylaminomethyl-4-oxocyclohepta [c] pyrrole hydrochloride.

The active compounds of this invention may be taken in tablets or capsules in doses of 1–100 mg., in syrup at 0.5–20 mg./ml. concentration, in 1–50 mg. suppositories or by parenteral injection in 0.5–50 mg./ml. concentration. More particularly, the oxocyclohepta [c] pyrroles hereof may be formulated in the same manner as the oxoisoindoles identified in the following further examples.

Example 2

Ingredients: Mg./tablet
4,5,6,7 - tetrahydro - 1,3 - dimethyl-5-dimethylaminoethyl-4-oxoisoindole hydrochloride ___ 10
Lactose USP (spray dried) _____ 170
Starch USP _____ 10
Magnesium stearate USP _____ 1
Flavor, q.s.

All above ingredients were passed through a 60-mesh sieve, blended for 30 minutes and compressed directly into tablets on a suitable tablet press at a weight of 191 mg., using a 11/32" biconcave scored punch.

Example 3

Ingredients: Mg./suppository
4,5,6,7 - tetrahydro-1,3-dimethyl-5-morpholinomethyl-4-oxoisoindole hydrochloride _____ 100
Cocoa butter, q.s.

The drug and cocoa butter are combined, mixed thoroughly and formed into 2-gram suppositories.

Example 4

Ingredients: Mg./capsule
4,5,6,7 - tetrahydro-1,3-dimethyl-4-oxo-5-piperidinomethylisoindole hydrochloride _____ 20
Lactose USP _____ 100
Magnesium stearate _____ 1
Amorphous silicon dioxide (Cab-O-Sil) _____ 5

These ingredients were combined, blended and passed through a No. 1 screen of Fitzpatrick comminutor machine before encapsulating into a two-piece hard gelatin No. 3 capsule on a standard capsulating machine at a net weight of 126 mg.

Example 5

Ingredients: Mg./ml.
4,5,6,7-tetrahydro - 1,2,3 - trimethyl-5-dimethylaminomethyl-4-oxoisoindole hydrochloride __ 5
Sodium chloride, q.s. for isotonicity.
Methylparaben USP _____ 1.8
propylparaben USP _____ 0.2
Water, q.s.

The above ingredients are combined in sterile solution for parenteral use.

Example 6

Ingredients: Grams/liter
4,5,6,7-tetrahydro - 1 - methyl-5-dimethylaminomethyl-4-oxo - 3 - phenylisoindole hydrochloride _____ 10
Granulated sugar _____ 600
Flavor, q.s.
Color, q.s.
Sodium benzoate _____ 1
Deionized water, q.s.

All above ingredients are dissolved in water, combined and made up to a volume of one liter.

The methobromide (10 g.) was dissolved in a mixture of 50 ml. of ethanol and 50 ml. of water. Upon addition of 20 ml. of normal aqueous sodium hydroxide, a yellow solid separated. It was filtered, washed with water and recrystallized to give the methylene compound, M.P. 197–198°.

Similarly, but starting with 4,5,6,7-tetrahydro-2-methyl-3-phenyl and 2-butyl-3-methyl-4-oxoindole there are produced the corresponding 4,5,6,7-tetrahydro-2-methyl-3-phenyl-2-butyl-3-methyl-5-dimethylaminomethyl - 4 - oxoindole, M.P. 182–183° and 138.5–139.5°, respectively.

Route 2.—4,5,6,7 - tetrahydro-2,3-dimethyl-4-oxoindole (16.3 g., 0.10 mole) was heated to reflux with 10.7 g. of paraformaldehyde (0.15 mole) and 14.5 g. of piperidine hydrochloride (0.12 mole) in 250 ml. ethanol. After 8 hours, another 1 g. of paraformaldehyde was added and refluxing continued for a total of 48 hours. The solution was evaporated to dryness in vacuo on a steam bath, the residue taken up in 150 ml. water to which 10 ml. of 2 N hydrochloric acid had been added and the solution freed from an insoluble residue (unchanged starting material) by filtration. The filtrate was made alkaline with ammonia water as above, whereupon a white solid precipitated. This was filtered, washed with water, dried at 80° and crystallized several times from benzene followed by crystallization from benzene-heptane. The 4,5,6,7-tetrahydro-2,3-dimethyl-4-oxo-5-piperidinomethylindole, M.P. 179°, thus obtained was dissolved in acetone and treated with excess methyl iodine. The methiodide salt, M.P. 219–220° crystallized upon standing overnight. Treatment with alkali as described for Route 1 produced the methylene compound, M.P. 197–198°.

We claim:

1. A compound of the formula:

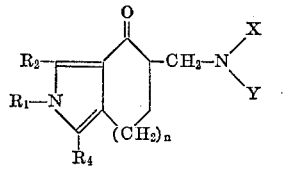

wherein $n$ is 2;

$R_1$, $R_2$ and $R_4$ are hydrogen, alkyl having a maximum of 6 carbon atoms, and phenyl, X and Y are the same or different and are hydrogen, lower alkyl, lower alkynyl, cycloalkyl having from 3 to 8 carbon atoms, heterocyclo-lower alkyl, in which the heterocycle is a piperidino, piperidinyl, morpholino, morpholinyl, or pyridyl group or, together with the nitrogen atom to which they are attached, X and Y define a heterocycle selected from the group consisting of piperidino, pyrrolidinyl, morpholino, thiomorpholino, and phenylpiperazinyl; or the pharmaceutically acceptable acid addition salts thereof.

2. A compound according to claim 1, wherein $R_1$ is hydrogen or lower alkyl and $R_2$ and $R_4$ are lower alkyl.

3. A compound according to claim 1 having the designation 2,4,5,6,7,8-hexahydro - 1,3 - dimethyl-5-dimethylaminomethyl-4-oxocyclohepta [c] pyrrole, and the pharmaceutically acceptable acid addition salts thereof.

References Cited

UNITED STATES PATENTS 3,491,093    1/1970    Pachter et al. _____ 260—247.5

ALEX MAZEL, Primary Examiner

J. A. NARCAVAGE, Assistant Examiner